United States Patent [19]

Kono

[11] 4,055,155
[45] Oct. 25, 1977

[54] FUEL SUPPLY SYSTEM FOR A ROTARY PISTON ENGINE

[75] Inventor: Toshiyuki Kono, Toyoake, Japan

[73] Assignee: Toyota Jidosha Kogyo Kabushiki Kaisha, Toyota, Japan

[21] Appl. No.: 631,415

[22] Filed: Nov. 12, 1975

[30] Foreign Application Priority Data

Aug. 15, 1975 Japan .................. 50-99386

[51] Int. Cl.² .......................... F02B 53/10
[52] U.S. Cl. ..................... 123/8.09; 123/119 LR
[58] Field of Search ............ 123/8.09, 8.11, 8.13, 123/32 EA, 32 ST, 119 R, 198 F, 198 DB

[56] References Cited

U.S. PATENT DOCUMENTS

| | | | |
|---|---|---|---|
| 3,589,344 | 6/1971 | Steinke | 123/8.09 |
| 3,827,237 | 8/1974 | Linder et al. | 60/276 X |
| 3,871,338 | 3/1975 | Schmidt et al. | 123/32 EA |
| 3,898,963 | 8/1975 | Iwata et al. | 123/8.09 X |
| 3,910,240 | 10/1975 | Omori et al. | 60/285 X |
| 3,980,054 | 9/1976 | Kono | 123/8.13 |
| 3,982,393 | 9/1976 | Musaki et al. | 60/274 |

*Primary Examiner*—Carlton R. Croyle
*Assistant Examiner*—Michael Koczo, Jr.
*Attorney, Agent, or Firm*—Birch, Stewart, Kolasch and Birch

[57] ABSTRACT

A fuel supply system for a rotary piston engine of the Wankel-type, adapted to supply fuel in the injection manner by varying the amount of fuel to be injected for individual combustion chambers so that the combustion of the rich or lean fuel-air mixture is effected substantially alternately in succeeding combustion chambers.

5 Claims, 3 Drawing Figures

AIR/FUEL RATIO VS EXHAUST GAS CONTENTS IN THE ROTARY PISTON ENGINE

FUEL SUPPLY SYSTEM FOR A ROTARY PISTON ENGINE

BACKGROUND OF THE INVENTION

1. Field of the Invention:

The present invention relates to a rotary piston engine and, more particularly, a method of and a device for supplying fuel to a rotary piston engine of the type which comprises a casing composed of a rotor housing having a trochoidal inner peripheral surface and side housings which close opposite ends of said rotor housing and a polygonal rotor adapted to rotate eccentrically in said casing with apex portions thereof sliding over said trochoidal surface while defining a plurality of combustion chambers between said trochoidal surface and individual side walls of said polygonal rotor.

2. Description of the Prior Art:

The rotary piston engine of the abovementioned type (Wankel-type) has, due to its particular combustion process, a feature that, although the HC and CO content in the exhaust gas are relatively high, the content of NOx is relatively low when compared with the conventional reciprocating piston engine. This feature of the rotary piston engine is utilized for providing a low air pollution engine, wherein HC and CO are eliminated by the recombustion of said constituents in a thermal reactor while the content of NOx is primarily low enough to satisfy the current regulations without any treatment therefor. However, it is expected that the regulations regarding the exhaust gas of automobiles will become stricter in the future. Therefore, the present rotary piston engine will soon exceed the limitation regarding the amount of NOx.

It is known that generally there is a relationship such as shown in FIG. 1 between the air/fuel ratio and the emission of HC, CO and NOx in the exhaust gas of a gasoline engine, although in FIG. 1 the scales for CO, HC and NOx are particularly adapted for the case of the rotary piston engine. As is apparent from FIG. 1, the NOx content in the exhaust gas becomes maximum when the air/fuel ratio is 15–16 and lowers relatively steeply as the air/fuel ratio increases or decreases from the abovementioned value. The present anti-air pollution rotary piston engine employs air/fuel ratio of about 12–13, whereby the emission of NOx is restricted within an acceptable limit while the HC and CO delivered in this operational condition are eliminated by recombusting the same in a thermal reactor. However, if, for example, the limit value of 0.25 g/km for NOx, which is expected to be enforced in the near future, is to be satisfied, the NOx content must be lower than 130ppm. To accomplish this, the air/fuel ratio must be either substantially low like the order of 11–12 or, on the contrary, relatively high like the order 18–19. If the air/fuel ratio is lowered to the order of 11–12, the amount of HC and CO substantially increases beyond the limit which can be processed by the present thermal reactor or catalyst. On the other hand, if the air/fuel ratio is increased so high as 18–19, the ignitability of fuel/air mixture becomes so poor as to cause misfiring and to make it difficult to maintain smooth operation of the engine. In this condition, the CO content is almost zero and although the amount of HC relatively increases when compared with its minimum value, its absolute value is still acceptable and it is possible to process the uncombusted components by the present thermal reactor or catalyst.

SUMMARY OF THE INVENTION

The present invention is based upon the considerations regarding the aforementioned relationship between the air/fuel ratio and the emission of HC, CO and NOx and contemplates providing an air-pollution free clean engine which can maintain smooth operation while supressing emission of NOx within the limit to satisfy the regulations, and simultaneously supressing the emission of HC and CO within the limits sufficient to be processed by a thermal reactor or catalyst.

Accordingly, the object of the present invention is to provide a novel system of supplying fuel for an airpollution free clean engine based upon the aforementioned principle.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

According to the present invention, the abovementioned object is accomplished by a method of supplying fuel to a rotary piston engine of the type comprising a casing composed of a rotor housing having a trochoidal inner peripheral surface and side housings which close opposite ends of said rotor housing, and a polygonal rotor adapted to rotate eccentrically in said casing with apex portions thereof sliding over said trochoidal surface while defining a plurality of combustion chambers between said trochoidal surface and individual flanks of said polygonal rotor, wherein relatively rich fuel-air mixture or a relatively lean fuel-air mixture is supplied to said plurality of combustion chambers according to a predetermined order.

According to the abovementioned method, for example, a first combustion chamber which performs the suction stroke in the first of the order is supplied with a relatively rich fuel-air mixture having a air/fuel ratio in the order of about 11–12 and a second combustion chamber which performs the suction stroke in the second of the order is supplied with a relatively lean fuel-air mixture having an air/fuel ratio in the order of about 18–19, the subsequent combustion chambers being supplied with a relatively rich or a relatively lean fuel-air mixture, alternately, in the same manner. Under this operating condition, the exhaust gas delivered from the rotary piston engine will show a low NOx value like below 130 ppm with respect to any combustion chamber operating with either the rich or the lean fuel-air mixture. As for the CO content, the exhaust from the combustion chamber which operates with a relatively rich fuel-air mixture will show about 7% emission of CO, while the exhaust from the combustion chamber which operates with the relatively lean fuel-air mixture will show substantially zero emission of CO, thus resulting in a mean value of CO emission in the order of 3.5% which is lower than the 4% in the conventional operation by air/fuel ratio of about 13. With respect to HC, the emission will slightly increase. However, since the absolute value of HC is relatively low, the overall content of the uncombusted components resulting from CO and HC is limited within the range which can be treated by the conventional thermal reactor.

The combustion in the combustion chamber supplied with the relatively lean fuel-air mixture of the air/fuel ratio in the order of about 18-19 will cause misfiring due to poor ignitability of the lean fuel-air mixture, if the rotation of the rotor is to be maintained only by such combustion, thereby causing unstable operation of the engine. In the present invention, however, the roation of the rotor is assisted by the stable combustion in the preceding combustion chamber operating with a relatively rich fuel-air mixture of the air/fuel ratio in the order of about 11-12, whereby the rotation of the rotor is stably maintained. Thus, the present invention accomplishes a reduction of the NOx, which is considered to be a most difficult component to reduce, to the order of 130 ppm which is the limit expected to be enforced in the near future, while suppressing CO and HC within an acceptable limit and ensuring smooth and stable operation of the engine.

With regard to the combustion of lean fuel-air mixture, there is a problem in that the temperature of the exhaust gas lowers thereby making it difficult to effect recombustion treatment of HC and CO. In this connection, the present invention provides for a solution because a relatively high exhaust gas temperature is obtained in the phase of the rich combustion in the alternate combustion of the rich and the lean fuel-air mixture, even when the overall air/fuel ratio is relatively high and, therefore, recombustion of the uncombusted components in the thermal reactor is effected with a high efficiency.

As an apparatus for supplying fuel in the abovementioned manner to the rotary piston engine of the abovementioned type, the present invention proposes a device comprising an intake port which opens in the inner wall of said casing, an intake manifold connected to said intake port for supplying air therethrough, and a fuel injection means for injecting fuel into said intake manifold, wherein a control means is provided for controlling said fuel injection means so as to generate a relatively rich fuel-air mixture or a relatively lean fuel-air mixture according to a predetermined order for said plurality of combustion chambers.

By supplying fuel in an injecting manner by employing the abovementioned fuel supply device, the amount of fuel supplied to individual combustion chambers can be controlled by regulating the time for injecting fuel in a very high responsiveness so that the amount of fuel is altered with high precision for every combustion chamber which successively performs the suction stroke, thereby effecting the abovementioned alternating combustion between the rich fuel combustion and the lean fuel combustion.

BRIEF DESCRIPTION OF THE DRAWING

The present invention will become more fully undertood from the detailed description given hereinbelow and the accompanying drawings which are given by way of illustration only, and thus are not limitative of the present invention, and wherein.

DESCRIPTION OF THE PREFERRED EMBODIMENT

Figure 1:
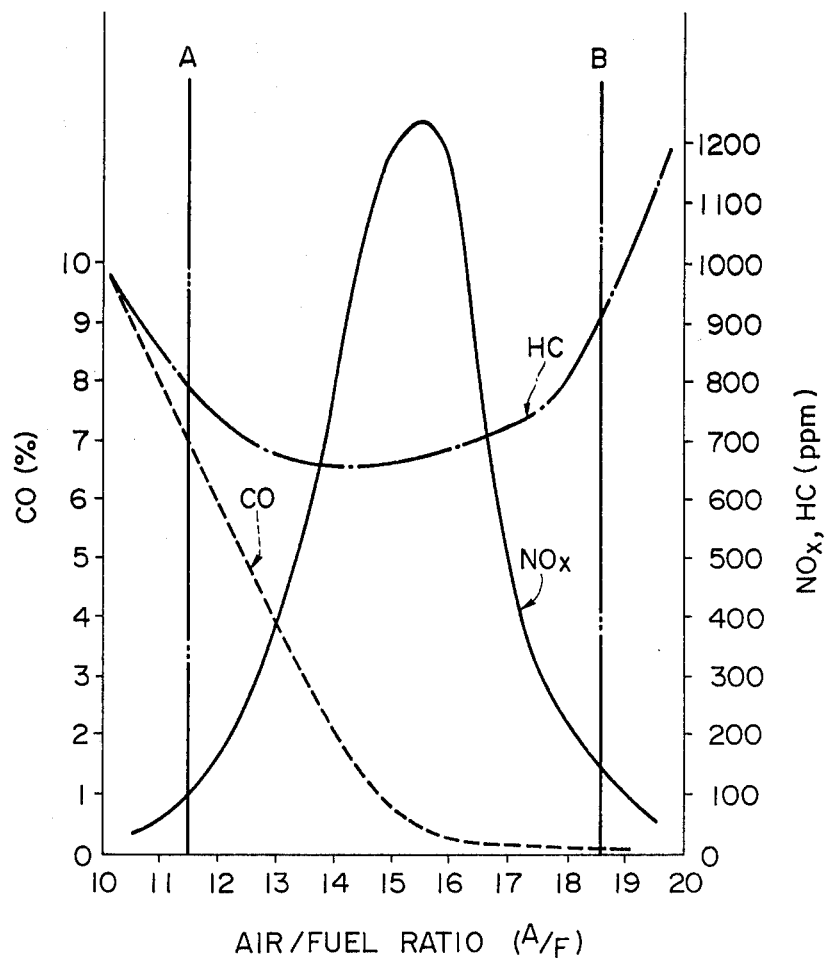
FIG. 1 is a graph showing the emission of CO, HC and NOx in the exhaust gas of a gasoline engine with respect to air/fuel ratio, the graph being particularly scaled for the rotary piston engine.
Figure 2:
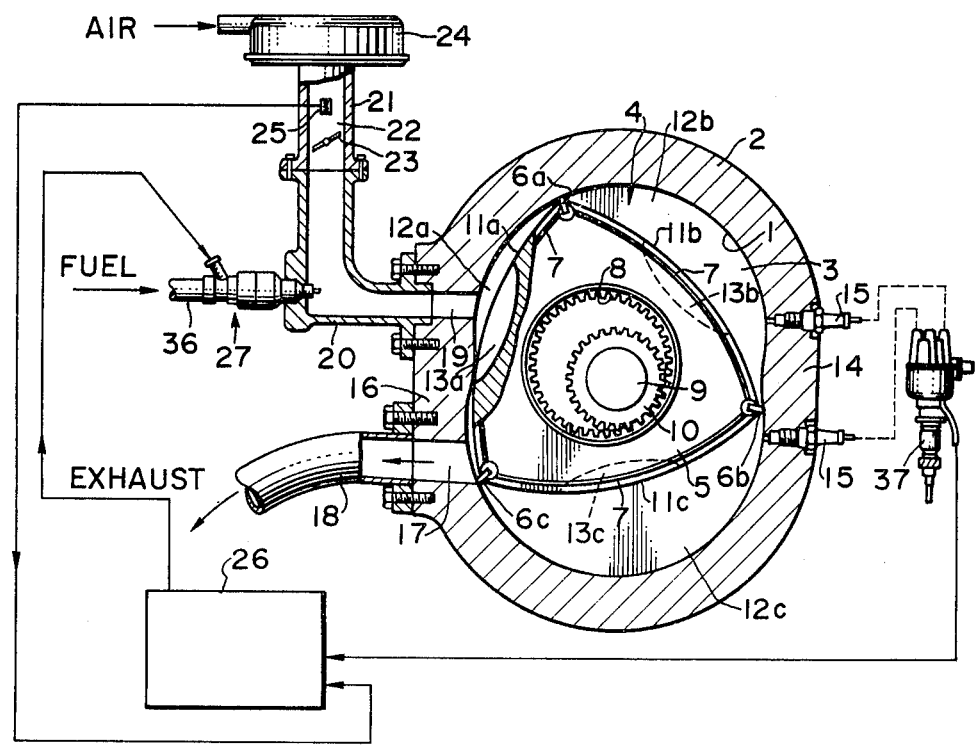
FIG. 2 is a diagrammatical view showing the basic constitution of the rotary piston engine incorporating the fuel supply system according to the present invention; and, FIG. 3 is a longitudial section of an example of a fuel injection means employable in the present invention.

Referring to FIG. 2, a rotor housing 2 having a trochoidal inner peripheral surface 1 is assembled with side housings 4 each having a flat inside surface 3 to provide a casing for housing a triangular rotor 5. The rotor is provided to be rotatable eccentrically around an eccentric shaft 9 with its apex seals 6a-6c provided at its three apex portions contacting said trochoidal surface. Side seals 7 are provided along three side edges and simultaneously contact said inner surface 3 of the side housing under the meshing of an internal gear 8 thereof with a fixed gear 10 of the eccentric shaft 9. The rotor 5 in the casing defines three combustion chambers 12a-12c by its three arcuate peripheral flanks 11a-11c cooperating with said trochoidal inner peripheral surface. For the three combustion chambers, said three arcuate flanks 11a-11c provide recesses 13a-13c at a central portion thereof, respectively. Adjacent a short axis portion 14 of the trochoidal inner surface 1 of the rotor housing 2 are provided two ignition plugs 15, while adjacent another short axis portion 16, rearward a seen in the rotational direction of the rotor, an exhaust port 17 is provided, said port being connected with an exhaust manifold 18. Adjacent the short axis portion 16, forward as seen in the rotational direction of the rotor, a peripheral intake port 19 is provided, siad port being connected with an intake manifold 20. A throttle body 21 is mounted at an inlet end of the intake manifold 20, said throttle body having an air supply passage 22 and a throttle valve 23 provided in said passage. Upstream of the throttle valve 23, an air flow sensor 25 is provided for detecting intake air flow supplied through the air supply passage 22. An air cleaner 24 is mounted at the entrance of the air supply passage 22. The air flow sensor 25 may be of any conventional type such as a heat wire sensor employing a heat sensitive resistor element, a flapper sensor employing a flapper element, etc. which is particularly adapted to dispatch an electric signal corresponding to the intake air flow. The electric signal from said sensor is supplied to an electric computer 26 as explained hereinunder. Note, the electric computer 26 may, for example, be a slight modification of the electronic system disclosed in FIG. 7 of U.S. Pat. No. 3,827,237.

Figure 3:
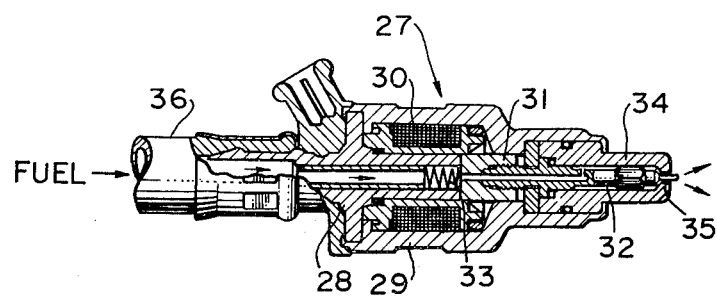

The intake manifold 20 is equipped with a fuel injection means 27 which injects fuel into the air supplied through the intake manifold according to a signal dispatched from the computer 26. The fuel injection means 27 may preferably be of an electro-magnetic type as exemplarly shown in FIG. 3. The fuel injection means 27 comprises a body 28 and a solenoid casing 29 supporting a solenoid 30 which, upon receipt of a driving pulse from the computer 26, draws a plunger 31 thereby shifting a needle valve body 32 against the action of a compression coil spring 33 to open an injection port 35 provided at a tip end portion of a nozzle body 34. A rear end portion of the body 28 is connected with a fuel supply hose 36 and the fuel supplied from said hose under pressure passes through a central opening provided in said body and further through a central opening provided in the plunger 31 and the needle valve body 32 to be ejected from the injection opening 35 into the intake manifold 20, as shown by arrows in the figure. As the stroke of the needle valve body is constant, the amount of fuel injected by the injection means is determined by the time in which the needle valve is opened, i.e., the time in which the solenoid is energized.

The computer 26 is supplied with a signal regarding the rotational phase of the rotor from a distributor 37 which may be of a conventional type. According to the timing signal supplied from the distributor 37, the computer 26 dispatches pulse signals for instructing fuel injection to the fuel injection means 27, said pulses being syncronized to the rotation of the rotor and changed asto their duration so as to be relatively long or relatively short according to a predetermined order, the absolute duration of said pulses being further modified according to the intake air flow detected by the air flow sensor 25. In more detail, if, for example, the combustion chamber 12a begins to perform a suction stroke, the computer 26 dispatches a relatively long pulse injection signal to the fuel injection means 27 according to the timing signal received from the distributor 37. Upon receipt of the injection signal, the fuel injection means 27 makes injection of fuel for a period determined by the duration of the pulse signal thereby injecting a relatively large amount of fuel into the air supplied through the throttle body 21, thus generating a relatively rich fuel-air mixture having the air/fuel ratio in the order of about 11-12, said mixture being supplied to the combustion chamber 12a. As the rotor 5 further rotates, the next combustion chamber 12c begins to perform a suction stroke. Corresponding to this rotation of the rotor, the next timing signal is supplied form the distributor 37 to the computer 26, which, upon receipt of the timing signal, dispatches a relatively short pulse injection signal to the fuel injection means 27 thereby having the fuel injection means inject a relatively small amount of fuel determined by the relatively short pulse injection signal to the air flowing through the intake manifold 20, thus generating a relatively lean fuel-air mixture having the air/fuel ratio in the order of about 18-19 for charging the combustion chamber 12c. As the rotor further rotates, for each combustion chamber which performs the suction stroke, the fuel injection means 27 provides fuel injection with a relatively long or short duration to generate a relatively rich or lean fuel-air mixture, respectively.

Instead of the aforementioned exact alteration of a relatively rich and lean fuel-air mixture, the alteration between the rich and the lean mixture may be varied in a manner so that, for example, after supplying a relatively rich fuel-air mixture, two or three additions of a relatively lean fuel-air mixture may be provided, repeating this cycle for successive combustion chambers.

Furthermore, although the intake port is formed as a peripheral port in the shown embodiment, this may be replaced by a side intake port.

Although the present invention has been shown and described with reference to a preferred embodiment, it should be understood by those skilled in the art that various modifications, omissions or additions may be made thereto without departing from the spirit of the present invention.

I claim:

1. A rotary piston engine comprising a casing composed of a rotor housing having a trochoidal inner peripheral surface and side housings which close opposite ends of said rotor housing, a polygonal rotor adapted to rotate eccentrically in said casing with apex portions thereof sliding over said trochoidal surface thereby defining a plurality of combustion chambers between said trochoidal surface and the individual flanks of said polygonal rotor, an intake port which opens in the inner wall of said casing, an intake manifold connected to said intake port for supplying air therethrough, a fuel injection means for injecting fuel into said intake manifold, means for detecting the intake air flow rate and for dispatching a first signal showing the intake air flow rate, means for detecting the rotation of said rotor and for dispatching a second signal showing the rotational timing of said rotor, a computer which operates, depending upon said first and second signals, to produce a series of fuel injection signals for actuating said fuel injection means in a manner such that the duration and timing of the fuel injection are determined by said first and second signals, respectively, and that the duration is further modified to be relatively long or short with respect to individual fuel injections according to a predetermined order so as to selectively produce a relatively rich fuel-air mixture of about 11-12 air/fuel ratio or a relatively lean fuel-air mixture of about 18-19 air/fuel ratio.

2. The engine of claim 1, wherein said fuel injection means is of an electromagnetic type and is adapted to make the fuel injection while it receives an electric pulse, and said series of fuel injection signals are a series of electric pulses.

3. The engine of claim 1, wherein a throttle body is mounted at the inlet end of the intake manifold and said means to dispatch said first signal is an air flow sensor provided in the throttle body.

4. The engine of claim 1, wherein said means to dispatch said second signal is a distributor.

5. The engine of claim 3, wherein the air flow sensor is a heat wire sensor employing a heat-sensitive resistor element.

* * * * *